US009776736B2

(12) United States Patent
Karasek et al.

(10) Patent No.: US 9,776,736 B2
(45) Date of Patent: Oct. 3, 2017

(54) COUPLING MODULE (71) Applicant: Hübner GmbH & Co. KG, Kassel (DE)

(72) Inventors: Jens Karasek, Kaufungen (DE); Ralf Schulz, Habichtswald (DE); Marc Heinrich, Shanghai (CN)

(73) Assignee: Hübner GmbH & Co. KG, Kassel (DE)

( * ) Notice: Subject to any disclaimer, the term of this patent is extended or adjusted under 35 U.S.C. 154(b) by 137 days.

(21) Appl. No.: 14/825,466

(22) Filed: Aug. 13, 2015

(65) Prior Publication Data
US 2016/0046391 A1    Feb. 18, 2016

(30) Foreign Application Priority Data

Aug. 16, 2014  (EP) ..................................... 14002855
Sep. 4, 2014   (EP) ..................................... 14183522

(51) Int. Cl.
*B64F 1/30*     (2006.01)
*B64F 1/305*    (2006.01)

(52) U.S. Cl.
CPC .................................. *B64F 1/3055* (2013.01)

(58) Field of Classification Search
CPC ........... B64F 1/3055; B64F 1/30; B64F 1/305
See application file for complete search history.

(56) References Cited

U.S. PATENT DOCUMENTS

| 3,538,529 | A | * | 11/1970 | Breier | B64F 1/3055 |
| | | | | | 14/71.5 |
| 3,693,204 | A | * | 9/1972 | Eggert, Jr. | B64F 1/305 |
| | | | | | 135/161 |
| 4,110,859 | A | * | 9/1978 | Lichti | B64F 1/305 |
| | | | | | 14/71.5 |
| 4,333,195 | A | * | 6/1982 | Lichti | B64F 1/305 |
| | | | | | 138/118 |
| 4,559,660 | A | | 12/1985 | Lichti | |
| 5,004,188 | A | * | 4/1991 | Donneky | B64F 1/3055 |
| | | | | | 14/71.3 |
| 7,596,826 | B2 | * | 10/2009 | Anderberg | B64F 1/305 |
| | | | | | 14/69.5 |
| 8,429,780 | B2 | * | 4/2013 | Scharf | B64F 1/3055 |
| | | | | | 14/71.5 |
| 2002/0116771 | A1 | | 8/2002 | Coles et al. | |

FOREIGN PATENT DOCUMENTS

| CN | 101088865 A | 12/2007 | |
| CN | 102285459 A | 12/2011 | |
| DE | 4322098 A1 * | 1/1995 | ............ B60D 5/003 |
| DE | 10046010 A1 | 3/2002 | |
| EP | 1867569 A2 | 12/2007 | |
| EP | 2397411 A1 | 12/2011 | |
| EP | 2397411 A1 | 12/2011 | |
| EP | 2463199 A1 | 6/2012 | |
| EP | 2463199 A1 | 6/2012 | |
| ES | 2334631 A1 | 3/2010 | |
| WO | 0076487 A2 | 12/2000 | |

* cited by examiner

*Primary Examiner* — Abigail A Risic
(74) *Attorney, Agent, or Firm* — Dinsmore & Shohl LLP (57) ABSTRACT

A coupling module provides an interface between the cabin of a passenger bridge and an aircraft. The coupling module has a projecting roof and a coupling module floor spanned by the projecting roof, with the coupling module being horizontally separable.

10 Claims, 7 Drawing Sheets

COUPLING MODULE

FIELD OF THE INVENTION

The invention relates to a coupling module as an interface between the cabin of a passenger bridge and an aircraft, wherein the coupling module has a projecting roof and a floor spanned by the projecting roof.

BACKGROUND OF THE INVENTION

Passenger bridges are sufficiently known from the prior art. Passenger bridges serve the passage of persons from the aircraft directly into the airport building. Since the airport building is frequently higher than the door opening of the aircraft, the passenger bridges, which are held by a traveling mechanism at the front end, frequently extend at a downward slope in the direction toward the door opening of the aircraft. The passenger bridge has a cabin at the lower end of the passenger bridge which is pivotable about a vertical axis by up to 90° with respect to the longitudinal axis of the passenger bridge. The coupling module is arranged at the front end for the passage from the cabin into the aircraft (see WO00/76487 A2). U.S. Pat. No. 2002/0116771 A1 and DE 10046010 A1 show a similar design of a passenger bridge. U.S. Pat. No. 4,559,660 likewise shows a cabin pivotable about a vertical axis. It has already been pointed out that the passenger bridge extends downwardly to the body of the aircraft. Consequently, the coupling module, which is arranged at the cabin and which has a floor which is spanned in a U shape by an extendable projecting roof, contacts the outer skin of the aircraft at an oblique angle to the aircraft with its bumper arranged at the end face of the projecting roof.

Coupling modules are likewise known having a projecting roof and a floor, wherein the floor is movably supported in the coupling module about the central longitudinal axis. The pivotably movable arrangement of the floor in the coupling module is complex and/or expensive.

A whole number of aircraft have a roof rail above the entrance. Due to the obliquely extending passenger bridge and, corresponding to this, due to the oblique position of the coupling module, when the bellows contacts the bumper arranged at the front side, the bumper frequently contacts the roof rail at the right hand side in a plan view of the aircraft door and projects upwardly over the contour of the aircraft at the left hand side. This is in particular the case with smaller aircraft whose contour slopes downward toward the cockpit in the region of the front door directly after the door. Consequently, the bumper on the right hand side of the door opening, which lies on the roof rail, is subject to relatively rapid wear and forms an opening with the outer skin of the aircraft at the left hand side through which rain, snow, etc. can enter.

It is proposed in accordance with EP 2 397 411 B1 to remedy these problems by providing a coupling module that is held by the cabin of the passenger bridge and pivotable about the horizontally extending central longitudinal axis. The coupling module is pivotable along an arc of a circle at the cabin of the passenger bridge such that the upper edge of the bumper of the coupling module can always be aligned exactly in parallel with the aircraft door. This means that the upper edge of the opening of the aircraft door serves as a reference line for the alignment of the coupling module. In this respect the floor of the coupling module can be in a fixed position, which has a positive effect on-the costs. A fixed floor for a coupling module as an interface is known from EP 2 463 199 B1 in this connection which, however, has individual segments extensible in the direction of the aircraft to adapt the floor to the contour of the aircraft. If, however, the coupling module is aligned in parallel with the upper edge of the door opening, this reduces the wear at the bumper, on the one hand, and makes provision, on the other hand, that the bumper contacts the outer skin of the aircraft in a circumferentially impervious manner in the region of the door opening of the aircraft.

The coupling module in accordance with EP 2 397 411 B1 has proven very good in daily use, but the, in particular, vertical extent of this coupling module is a disadvantage, as also with every other coupling module. The vertical extent or height of the coupling module amounts to approximately 3.70 m. The transportation of such a coupling module in the assembled state is very complex in that no standard containers can be used for the transportation. To this extent, a change has also been made to dispatch the coupling module in the dismantled state, which has the disadvantage, however, that it has to be assembled on site. Due to the large number of individual parts and to the complexity of the design, and here in particular of the pivot device, it has been found to be necessary that in many cases the installation of the coupling module for such a passenger bridge has to be monitored on site by personnel from the manufacturer. This is expensive and ultimately also ties up staff.

SUMMARY OF THE INVENTION

The underlying object of the invention comprises providing a remedy to the above problems here. The possibility of transporting such a coupling module in a commercial container should in particular be made possible to save transportation costs.

It is proposed to achieve the object in accordance with the invention that the coupling module is horizontally separable. This means that the coupling module can be divided in height. The divisibility is in particular to be designed such that the installation is simple and the assembly can in particular also take place on site by untrained personnel without problems. It should in particular be avoided that staff from the manufacturer have to monitor the installation. The division of the coupling module furthermore takes place at a height of approximately 2 m. This has the consequence that the parts of the coupling module fit through the door of a standard container.

Advantageous features and embodiments of the invention result from the dependent claims.

Provision is thus in particular made that the coupling module comprises two limbs as well as a ceiling web which connects the limbs at the ceiling side, wherein the coupling module is divisible in the region of the limbs while forming a coupling module head part and a coupling module base part. In this respect, the coupling module head part advantageously has two head part limbs and the coupling module base part advantageously has two base part limbs, with the head part limb and the base part limb being connected to one another by at least one spigot. The spigot has two purposes in this respect; on the one hand, it provides the centering of the coupling module head part with respect to the coupling module base part on the installation and, on the other hand, it provides the required stability of the connection between the coupling module head part and the coupling module base part. Provision is made in accordance with a further feature of the invention for the actual connection between the coupling module head part and the coupling module base part that the head part limb and the base part limb each have a coupling plate, which coupling plates are connectable to one another, in particular by screws. It is thus obvious that the maximum height of the individual components can be reduced so much, in a simple manner, by the division of the coupling module into two parts, namely into a respective coupling module head part and a coupling module base part, that the parts fit into commercial containers. Substantial transportation costs are saved in this respect. It is furthermore obvious that the installation of the two parts, namely of the coupling module head part and of the coupling module base part, is possible in a simple manner so that it is not necessary that the installation staff of the manufacturing company monitor the installation on site.

Provision is furthermore made in detail that the coupling module has an adapter frame and a pivot frame, wherein the adapter frame and the pivot frame are connected to one another by a pivot device in the region of the coupling module base part. It has already been pointed out that an alignment of the coupling module relative to the door opening of the aircraft takes place by a pivotability of the coupling module with the projecting roof about an imaginary horizontal axis relative to the cabin of the passenger bridge. Since now the pivot device is arranged in the region of the coupling module base part, this part of the coupling module forms a prefabricated unit which does not make any adaptations at all necessary in the installation or dismantling. This means that the coupling module base part can be directly connected to the coupling module head part in the form in which it was packed so that a coupling module ready to use is then present immediately after attaching the projecting roof This means that any adjustment of the pivot device is not necessary. However, it also becomes clear from this that e.g. an acceptance protocol for the pivot device remains valid.

Provision is in particular made in this connection that the adapter frame and the pivot frame of the coupling module have a floor web in the region of the coupling module floor, wherein the pivot device has at least three pivot apparatus, with a respective one pivot apparatus being arranged at each base part limb and one pivot apparatus in the floor web. It again becomes clear from this that all the parts of the pivot device are components of the coupling module base part.

Each pivot apparatus furthermore has an arcuate rail section, which is round in cross-section, for receiving at least two rollers, with the rail section being arranged on the adapter frame and the at least two rollers being arranged on the pivot frame.

The rollers have a respective first and second collar at opposite ends for guiding the rollers on the arcuate rail section, which is round in cross-section. In this respect, the first collar is advantageously larger in its extent in the direction of the equator of the rail section, which is round in cross-section, on the side of the roller which faces the adapter frame than that of the collar of the roller on the oppositely disposed side of the roller. This in light of the following: The floor of the coupling module is held by the pivot frame. This means that, when persons are standing on the floor of the pivot frame, the pivot frame experiences a torque in the direction of the front side of the floor. Since the collar on the side of the roller facing the adapter frame is now larger, the higher torque can be taken up without problem. This means that the introduction of the corresponding forces, in particular on a load on the floor, into the rail takes place more uniformly by the roller.

BRIEF DESCRIPTION OF THE FIGURES

The invention will be described in more detail below by way of example with reference to the drawings.

DETAILED DESCRIPTION OF THE INVENTION

Figure 1:
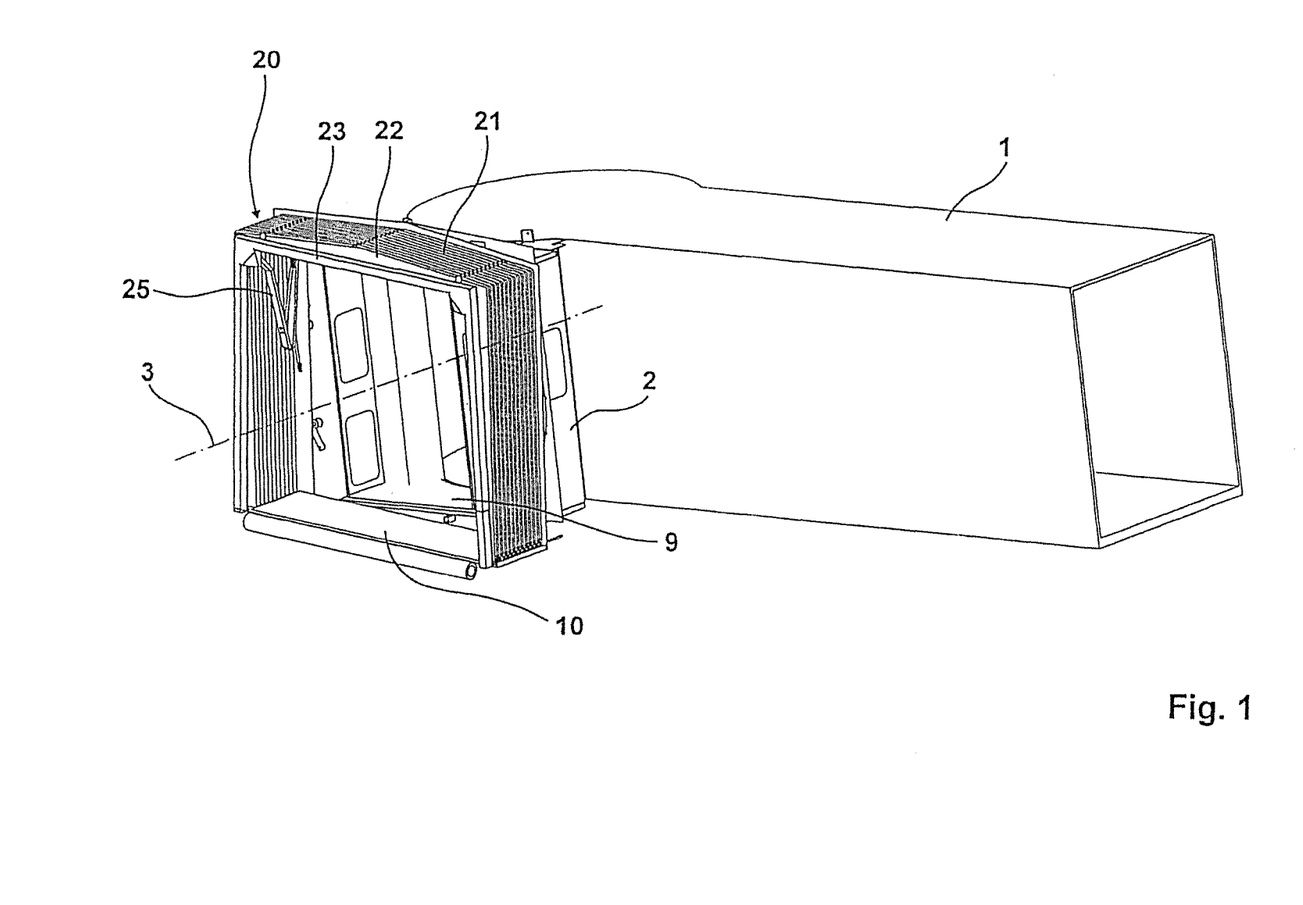
FIG. 1 is a perspective view of the passenger bridge with a coupling module connected to the front end in an articulated manner in the pivoted state of the coupling module relative to the cabin of the passenger bridge.

The passenger bridge designated by 1 can be recognized from the representation in accordance with FIG. 1 which shows a cabin angled at an angle of 90° to the passenger bridge at its front end, but forming a component of the passenger bridge 1. The coupling module designated in its entirety by 20 is pivotably connected in an articulated manner about an imaginary horizontal axis 3 to the cabin 2. The coupling module 20 faces at its free end face a frame 22 arranged at the projecting roof 21, with the bumper designated by 23 being attached to the frame. A respective pivot arm 25 is provided at both sides in the interior of the coupling module, the pivot arms serving the deployment movement of the projecting roof 21 of the coupling module in order finally to be able to bring the bumper 23 into contact with the outer skin of the aircraft fuselage. The coupling module 20 furthermore shows the floor 10 on which the passengers walk directly after disembarking from the aircraft. The cabin floor 9 of the cabin which the passenger bridge 1 adjoins is located behind the floor 10 of the coupling module in the direction toward the passenger bridge 1.

Figure 2:
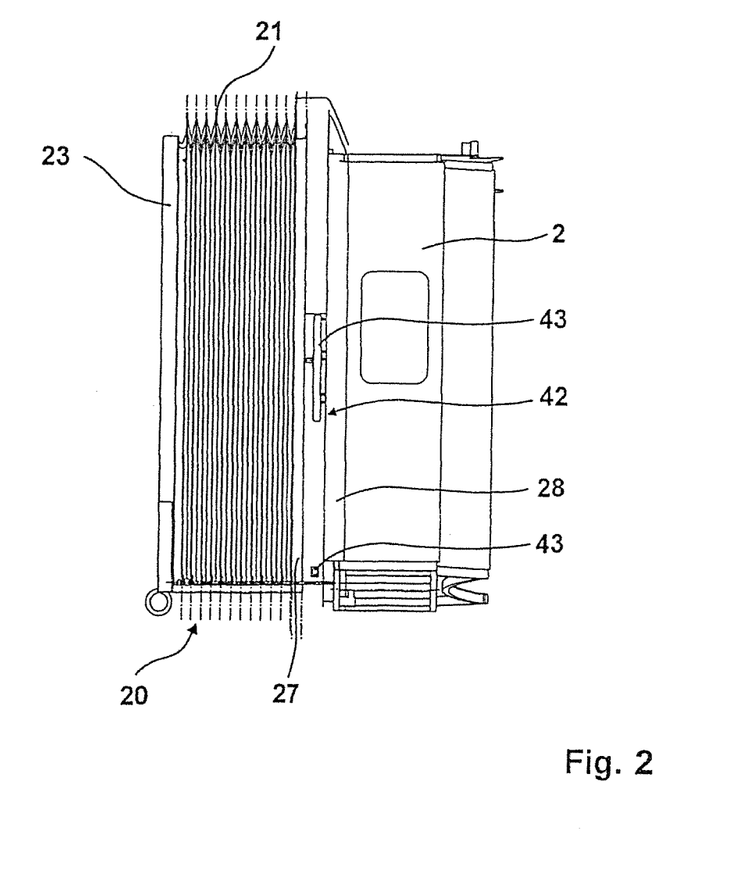
FIG. 2 is a side view of the transition from the cabin of the passenger bridge to the coupling module.

FIG. 2 shows a side view of the coupling module with the cabin in accordance with FIG. 1. It can be recognized in this respect that the coupling module has a pivot frame 27, with the pivot frame 27 being connected to the adapter frame 28 of the cabin 2 by the pivot apparatus 42 of the pivot device 40.

Figure 3:
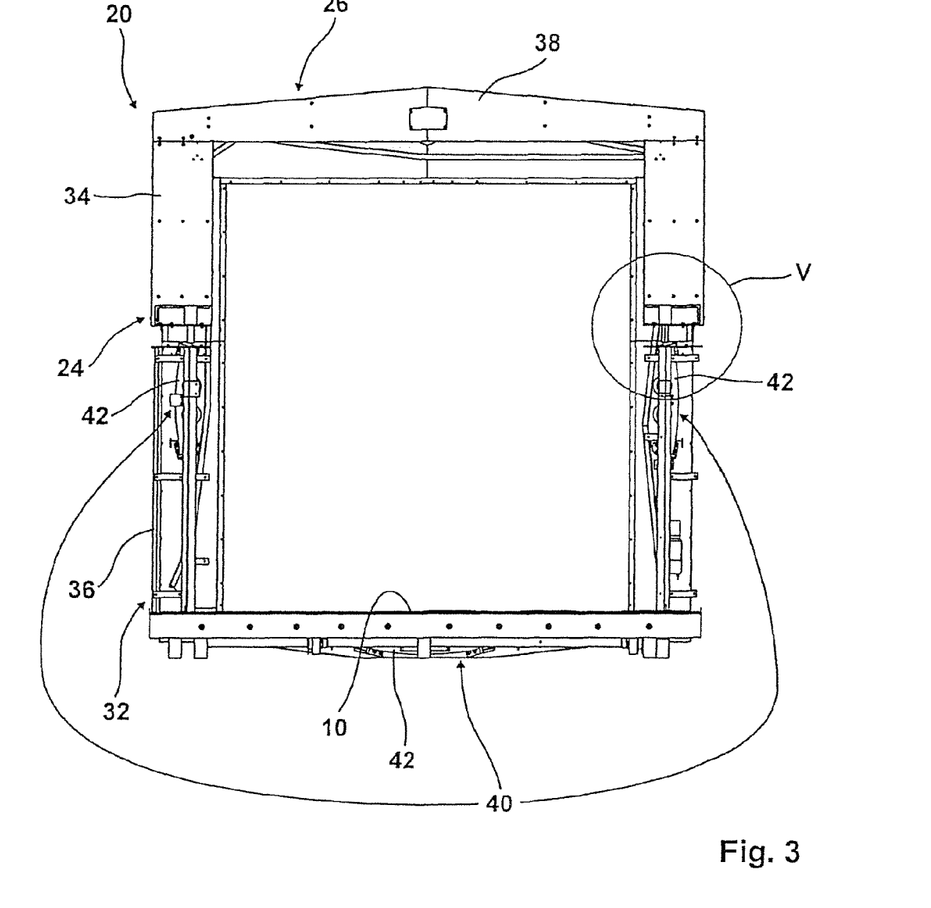
FIG. 3 is a front view of the coupling module without a projecting roof from the aircraft side.

Referring now to FIG. 3, it can be recognized that the coupling module 20 in detail comprises a coupling module head part 26 and a coupling module base part 32 which are both releasably connected to one another, which will be looked at in more detail at another point. The coupling module head part 26 comprises the two head part limbs 34 which are connected to one another by the ceiling web 38. The coupling module base part 32, which is shown partially stripped, has the two base part limbs 36, with the base part limbs 36 being releasably connectable to the head part limbs 34. Each base part limb 36 forms, together with the head part limb 34, the limb 24 of the coupling module 20, that is the coupling module limb.

Figure 5:
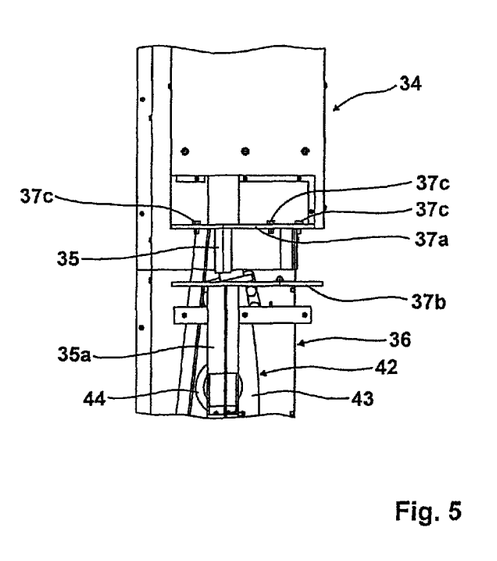
FIG. 5 is a view in accordance with the detail 5 of FIG. 3.
Figure 7:
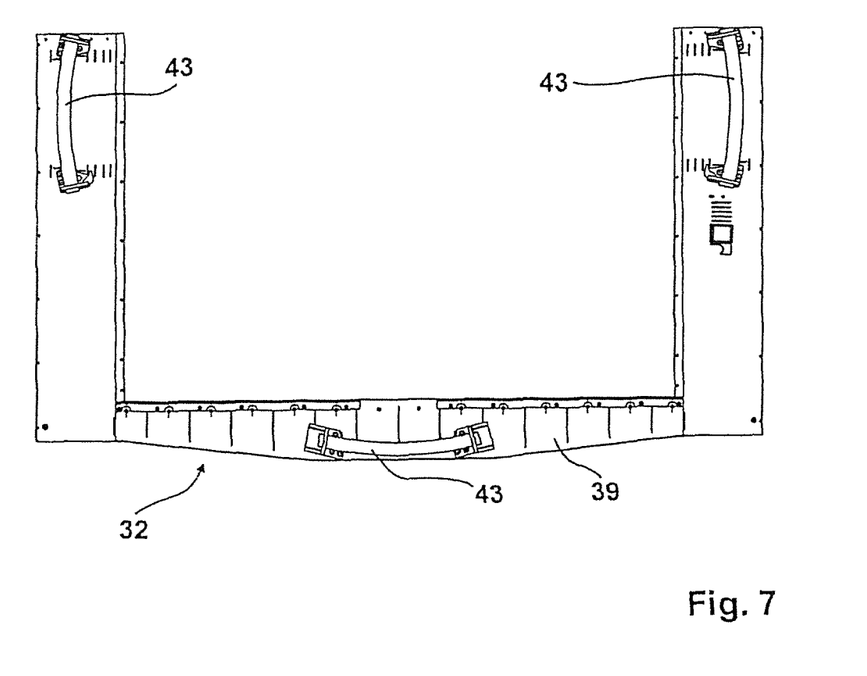
FIG. 7 is a view of the coupling module base part, showing only the two base part limbs and the floor web connecting the two base part limbs, including the three rail sections of the pivot device.

The base part limbs 36 of the coupling module 20 are connected by the floor web 39, as in particular results in the view of FIG. 7. Reference is made to FIG. 5 in the following for the divisibility of the coupling module head part from the coupling module base part. It can be recognized from this that the head part limb 34 of the coupling module head part 26 has a first coupling plate 37a and the base part limb 36 has a second coupling plate 37b. The head part limb 34 furthermore has a spigot 35 in the region of the first coupling plate 37a, with a receiver 35a for the spigot 35 being provided in the region of the second coupling plate 37b of the base part limb 36. For the assembly of the coupling module head part 26 with the coupling module base part 32, the spigot 35 now moves into the receiver 35a for the spigot, with the two coupling plates 37a and 37b being connected to one another by screws 37c.

It has already been pointed out that the coupling module 20 has a pivot frame 27 and an adapter frame 28, with the pivot frame 27 being connected to the adapter frame 28 by a pivot device 40. It is important here that the pivot device 40 is only located in the region of the coupling module base part 32. This means that the pivoting of the pivot frame relative to the adapter frame 28 by the pivot device only takes place by the pivot device 40 arranged at the coupling module base part (FIG. 3). However, it also follows on from this that the pivot device 40 is not affected for the dismantling or the installation.

Figure 4:
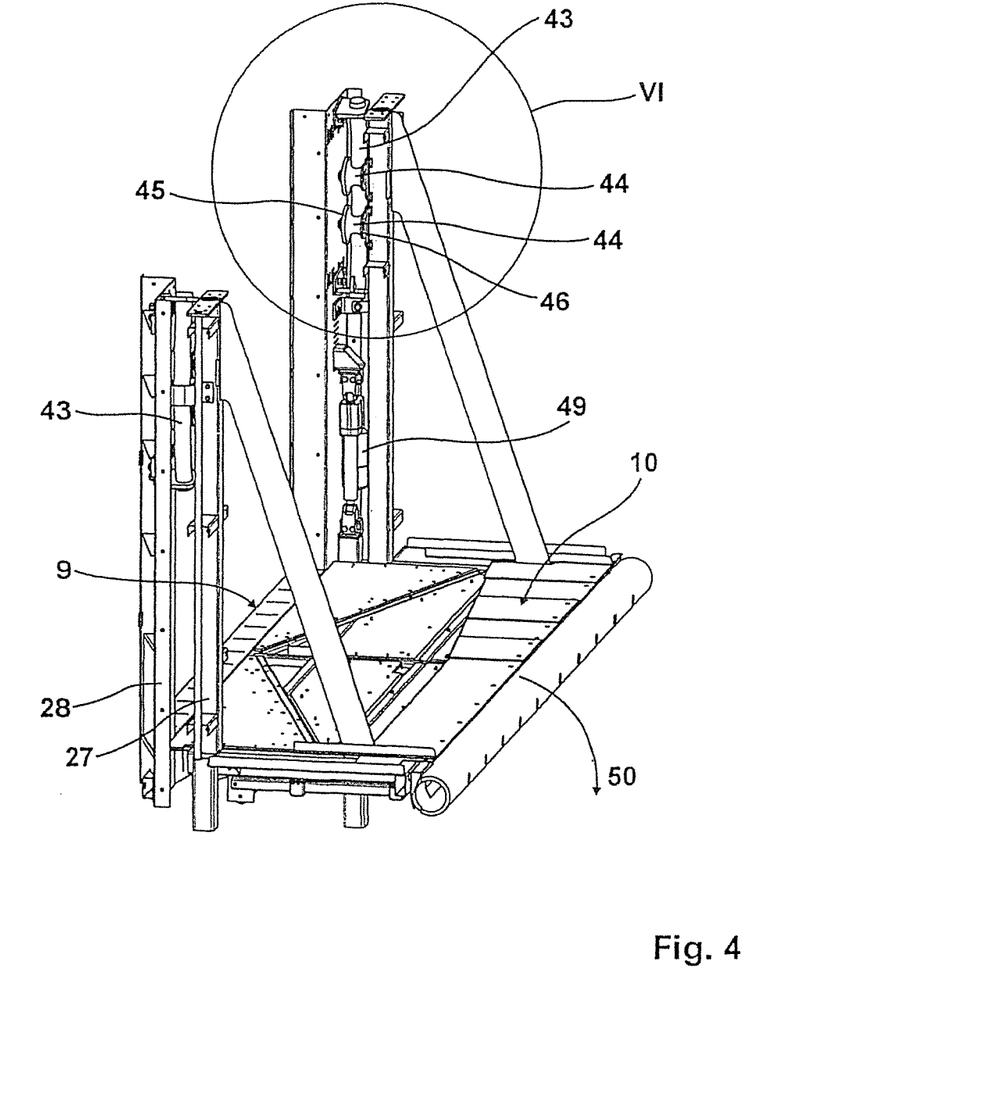
FIG. 4 is a perspective view of the coupling module base part.
Figure 6:
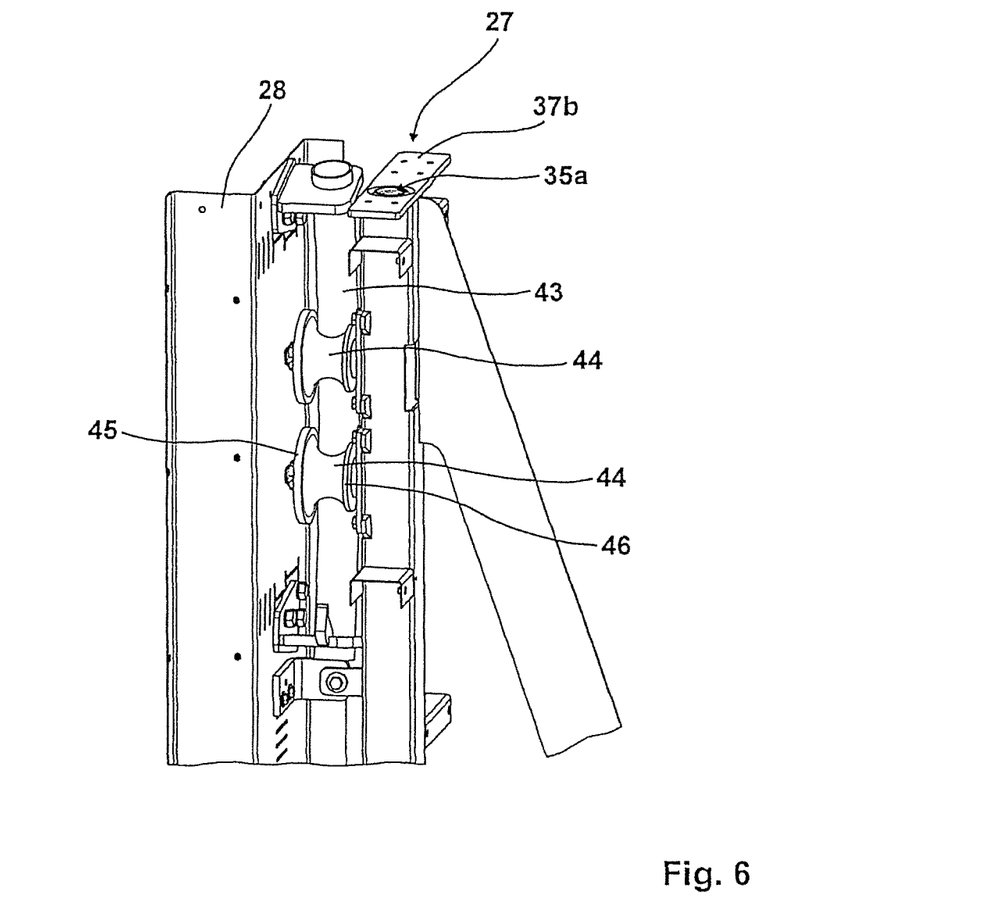
FIG. 6 is a view of the detail 6 of FIG. 4.

The configuration of the three pivot apparatus 42, which together form the pivot device 40, in particular results from FIG. 4, but also from FIG. 6 and FIG. 7. The pivot apparatus 42 comprises the rail section 43, which is arcuate and which is round in cross-section, as already results from the view of FIG. 4 and FIG. 6, but in particular also from FIG. 7. The rail section 43 receives two rollers 44, with each roller 44 having a first large collar 45 and a second smaller collar 46. It has already been pointed out at another passage that the first large collar 45 reaches up to the equator of the rail section 43, which is round in cross-section. This means that the covering of the rail section 43, circular in cross-section, by the first, larger collar 45 provides that a comparatively larger torque can be taken up in the direction of the arrow 50 in accordance with FIG. 4 than in the opposite direction. This in the light of the fact that larger torques then arise in the direction of the arrow 50 when a plurality of persons stand on the floor 10 of the coupling module.

A pivot drive 49, which is represented as a piston-in-cylinder drive, is provided in the region of the pivot apparatus 42 for pivoting the pivot arm 25 relative to the adapter frame 28 by the pivot device 40. A displacement of the pivot frame 27 relative to the adapter frame 28, consequently a displacement of the two rollers 44 on the rail section 43, takes place by the pivot drive 49.

REFERENCE NUMERAL LIST 1 passenger bridge
2 cabin
3 central longitudinal axis
9 cabin floor
10 coupling module floor
20 coupling module
21 projecting roof
22 frame at the projecting roof
23 bumper
24 limb of the coupling module (coupling module limb)
25 pivot arm
26 coupling module head part
27 pivot frame
28 adapter frame
32 coupling module base part
34 head part limb
35 spigot
35a receiver for spigot
36 base part limb
37a first coupling plate of the head part limb
37b second coupling plate of the base part limb
37c screws
38 ceiling web
39 floor web
40 pivot device
42 pivot apparatus
43 rail section
44 roller
45 first large collar
46 second, smaller collar
49 pivot drive
50 arrow

The invention claimed is:

1. A coupling module for providing an interface between a cabin of a passenger bridge and an aircraft, the coupling module comprising: a coupling module having a projecting roof, a coupling module floor spanned by the projecting roof, and two coupling module limbs each extending between the projecting roof and module floor;
wherein the two coupling module limbs of the coupling module are horizontally separable such that the coupling module is separable into a coupling module head part and a coupling module base part between the projecting roof and the module floor.

2. A coupling module in accordance with claim 1, wherein the coupling module further comprises
a ceiling web connecting the coupling module limbs at a ceiling side.

3. A coupling module for providing an interface between a cabin of a passenger bridge and an aircraft, the coupling module comprising:
a projecting roof;
a coupling module floor spanned by the projecting roof;
two coupling module limbs; and
a ceiling web connecting the coupling module limbs at a ceiling side;
wherein the coupling module is horizontally separable into a coupling module head part and a coupling module base part;
wherein the coupling module is horizontally separable in the region of the coupling module limbs into the coupling module head part and the coupling module base part;
wherein the coupling module head part has two head part limbs and the coupling module base part has two base part limbs, with the respective head part limb being connected to the base part limb by at least one spigot.

4. A coupling module in accordance with claim 3, wherein the head part limb and the base part limb each have a coupling plate which connect to one another.

5. A coupling module in accordance with claim 3, further comprising:
an adapter frame; and
a pivot frame;
the adapter frame and the pivot frame being connected to one another by a pivot device in the region of the coupling module base part.

6. A coupling module in accordance with claim 5, wherein:
the adapter frame and the pivot frame of the coupling module each have a floor web in the region of the coupling module floor; and
the pivot device comprises at least three pivot apparatus, with a respective one pivot apparatus being arranged in each of the base part limbs and one pivot apparatus being arranged at the floor web.

7. A coupling module in accordance with claim 6, wherein each pivot apparatus has an arcuate rail section, which is round in cross-section, for receiving at least two rollers, with the rail section being arranged at the adapter frame and the at least two rollers being arranged at the pivot frame.

8. A coupling module in accordance with claim 7, wherein the rollers each have a first collar at their side facing the adapter frame, said collar having an extent in the direction of the equator of the rail section which is larger than that of a second collar of the oppositely disposed side of the roller.

9. A coupling module for providing an interface between a cabin of a passenger bridge and an aircraft, the coupling module comprising:
   a projecting roof;
   a coupling module floor spanned by the projecting roof;
   two coupling module limbs; and
   a ceiling web connecting the coupling module limbs at a ceiling side;
   wherein the coupling module is horizontally separable into a coupling module head part and a coupling module base part;
   wherein the coupling module is horizontally separable in the region of the coupling module limbs into the coupling module head part and the coupling module base part;
   wherein the coupling module head part has two head part limbs and the coupling module base part has two base part limbs, with the respective head part limb being connected to the base part limb.

10. A coupling module for providing an interface between a cabin of a passenger bridge and an aircraft, the coupling module comprising:
   a coupling module having:
      a projecting roof;
      a coupling module floor spanned by the projecting roof;
      two coupling module limbs; and
      a ceiling web connecting the coupling module limbs at a ceiling side;
   wherein the coupling module is horizontally separable into a coupling module head part and a coupling module base part;
   wherein the coupling module is horizontally separable in the region of the coupling module limbs into the coupling module head part and the coupling module base part;
   wherein the coupling module head part has two head part limbs and the coupling module base part has two base part limbs, with the respective head part limb being connected to the base part limb;
   wherein the head part limb and the base part limb each have a coupling plate which connect to one another.

* * * * *